United States Patent [19]

Jackson

[11] Patent Number: 4,936,172
[45] Date of Patent: Jun. 26, 1990

[54] INTERLOCKING SCREW AND SCREWDRIVER

[76] Inventor: Jack D. Jackson, HC-51-Box 32, Jacksboro, Tex. 76056

[21] Appl. No.: 321,147

[22] Filed: Mar. 9, 1989

[51] Int. Cl.$^5$ .............................................. B25B 23/10
[52] U.S. Cl. ......................................... 81/451; 81/460
[58] Field of Search .................. 81/436, 442, 443, 451, 81/460

[56] References Cited

U.S. PATENT DOCUMENTS

| | | | |
|---|---|---|---|
| 3,120,251 | 2/1964 | York | 81/436 |
| 3,392,767 | 7/1968 | Stillwagon | 81/451 |
| 3,463,209 | 8/1969 | Podolsky . | |
| 3,675,694 | 7/1972 | Barlow . | |
| 3,695,321 | 10/1972 | Garehime, Jr. . | |
| 3,888,144 | 6/1975 | Parsons . | |
| 4,033,244 | 7/1977 | Jacobson | 81/451 X |
| 4,037,514 | 7/1977 | Lliteras . | |
| 4,038,757 | 8/1977 | Hicks et al. | 81/451 X |
| 4,128,038 | 12/1978 | Urwin . | |
| 4,130,152 | 12/1978 | Bolen | 81/451 |
| 4,269,246 | 5/1981 | Larson et al. . | |
| 4,526,071 | 7/1985 | Post | 81/451 |
| 4,648,293 | 3/1987 | McCauley | 81/451 X |

Primary Examiner—James G. Smith
Attorney, Agent, or Firm—Charles D. Gunter, Jr.

[57] ABSTRACT

A screwdriver and mating screw are shown with interlocking features for coupling with one another to facilitate driving the screw into a workpiece. The screwdriver includes a handle and a blade with an engagement flange on the outer extremity of the blade. The engagement flange engages a complementary recess provided in the head of the mating screw, the recess including a downwardly facing shoulder. A coupling sleeve mounted on the blade exerts an axially directed force on the screw once the engagement flange and complementary recess are engaged to thereby interlock the screwdriver and mating screw.

5 Claims, 2 Drawing Sheets

U.S. Patent  Jun. 26, 1990  Sheet 1 of 2  4,936,172
FIG. 1
FIG. 2
FIG. 3
FIG. 4
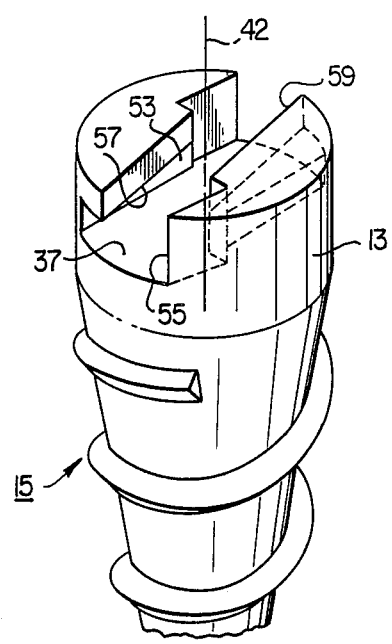
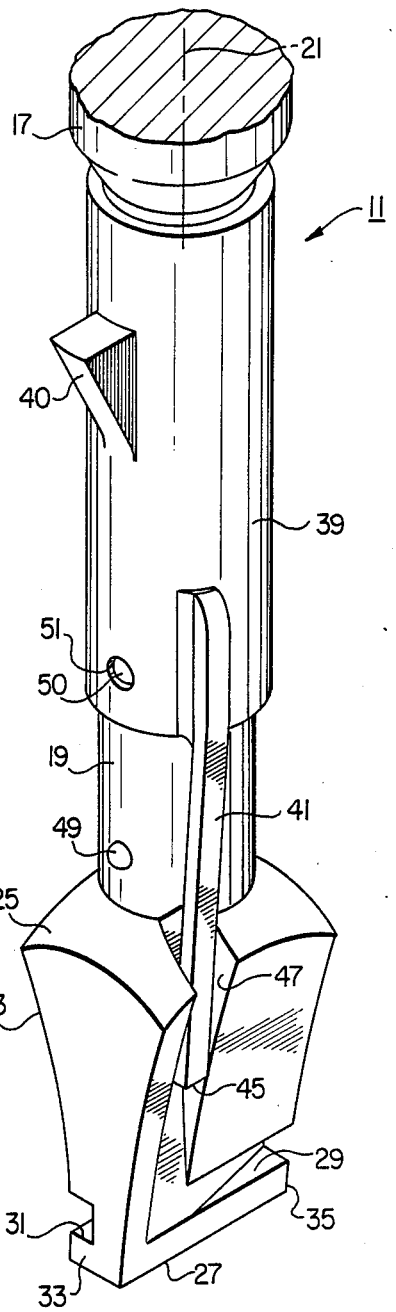
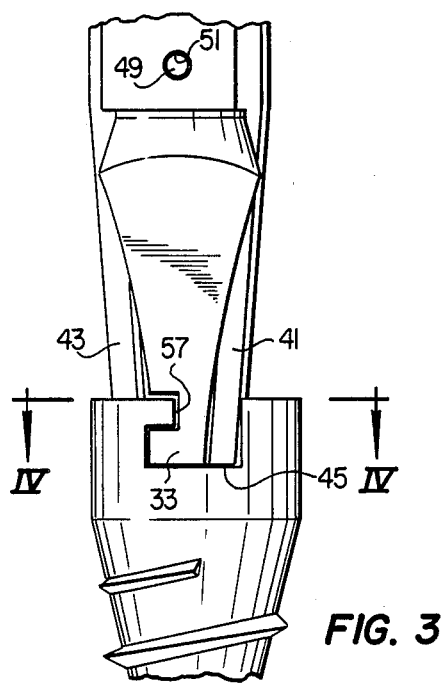
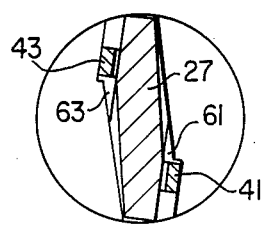

INTERLOCKING SCREW AND SCREWDRIVER

BACKGROUND OF THE INVENTION

1. Field of the Invention

The present invention relates to a screw or fastener and to a driving tool to drive or withdraw such screw, the screw and driving tool being releasably coupled during operation.

2. Description of the Prior Art

A number of screw and screwdriver combinations are known in the prior art which are intended to overcome the problem of slip-out or displacement of the screwdriver and screw while endeavoring to drive the screw home, as well as while endeavoring to remove the screw. These problems can result in ruining the engagement slot provided in the screw head, damage to the bit of the screwdriver and present the possibility of injury to the user. In many cases, screws have been damaged beyond effective use, requiring replacement. In some cases the screwdriver itself was damaged beyond repair. Also, while attempting to remove prior art screws, the surrounding portions of the workpiece have, on occasion, splintered or become otherwise damaged, requiring costly repair.

U.S. Pat. No. 3,675,694, to Barlow, issued July 11, 1972, shows a screw having a screw head with laterally extending keyways. A companion screwdriver has mating keys which mate with the keyways of the screw during use to compensate for misalignment and eliminate bouncing of the blade of the screwdriver from the screw slot. It was necessary to maintain at least a minimum positive pressure between the screwdriver and screw to maintain the key and keyway engagement.

Similarly, the following U.S. Patents show prior art screws and screwdrivers, the screw head being provided with a uniquely shaped engagement opening for mating with the driving tool to assist in maintaining alignment of the screw and driving tool: U.S. Pat. Nos. 3,463,209; 4,037,514; 4,269,246; 4,128,038; and 3,888,144. The devices shown in each of these references require that at least a minimum driving pressure be exerted between the driving tool and screw to maintain the engagement thereof.

U.S. Pat. No. 3,695,321 to Garehime, Jr., issued Oct. 3, 1972, shows a cavity head screw and driving tool, the screw having undercut cavities and a central bore. The driving tool has multiple blades and a central pin which is received within the screw hole. The screwdriver blades mate with the undercut sidewalls of the screw cavity to align and axially stabilize the screwdriver and screw during operation.

In spite of the above advances, there exists a need for a screw and driving tool which maintains the screw and driving tool in a coupled state, even when no pressure is exerted to maintain the driving tool in working engagement with the screw.

The present invention has as its object to provide a screw and screwdriver combination with interlocking features for releasably coupling the screwdriver to the head of a mating screw to facilitate driving or removing the mating screw into or from a workpiece.

A further object of the invention is to provide a coupling mechanism between the screwdriver and mating screw which maintains the alignment of the screwdriver and the screw head to thereby prevent bounce, slip-out or displacement of the screwdriver from the screw.

Another object of the invention is to provide a screwdriver and mating screw which are positively coupled during use to provide greater turning power and less likelihood of slippage or accidental disengagement than was previously possible.

Additional objects, features and advantages will be apparent in the written description which follows.

SUMMARY OF THE INVENTION

The screwdriver of the invention is releasably coupled to the head of a mating screw to facilitate driving the mating screw into a workpiece. The screwdriver includes a handle and a blade on the handle, the blade having an outer extremity opposite the handle. Engagement means on the outer extremity of the blade releasably engage a complementary surface provided in the head of the mating screw. Coupling means slidably mounted on the blade positively couple the screwdriver and the screw once the engagement means are engaged to thereby interlock the screwdriver and mating screw.

Preferably, the coupling means includes a generally cylindrical sliding sleeve which circumscribes the blade, the sleeve being slidable between a retracted position and a set position in which the sleeve contacts the screw head and exerts an axially directed force on the screw. Detent means can be provided for maintaining the sliding sleeve in the set position once the engagement means are engaged to interlock the screwdriver and mating screw to positively couple the same, even when no force is being exerted by the user. The engagement means preferably includes a flange on the outer extremity of the blade which seats beneath a downwardly facing shoulder provided in a complementary surface of the head of the mating screw.

Additional objects, features and advantages will be apparent in the written description which follows.

BRIEF DESCRIPTION OF THE DRAWINGS

FIG. 1 is a perspective view, partly broken away of a mating screw intended for use with the screwdriver of FIG. 2;

FIG. 2 is a perspective view of the screwdriver used with the mating screw of FIG. 1, the handle being partly broken away;

FIG. 3 is a partial, side view of the screwdriver and screw of FIGS. 1 and 2 in the engaged and coupled position;

FIG. 4 is a cross-sectional view taken along lines IV.—IV. in FIG. 3;

in FIG. 5;

FIG. 8 is a perspective view, partly broken away, of a mating screw intended for use with the screwdriver of FIG. 6;

DETAILED DESCRIPTION OF THE INVENTION

Figure 5:
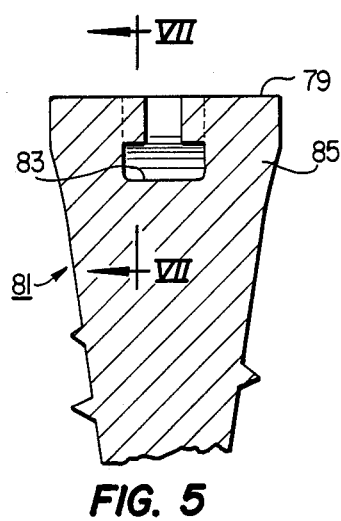
FIG. 5 is a cross-sectional view taken along lines V.—V.

FIGS. 1 and 2 show the interlocking screw and screwdriver of the invention. As will be described, the screwdriver (11 in FIG. 1) has locking features for releasably coupling the screwdriver to the head 13 of a mating screw (15 in FIG. 1) to facilitate driving the mating screw 15 into a workpiece (not shown). The screwdriver 11 includes a handle 17 which is shown broken away in FIG. 2 for ease of illustration. The handle 17 can be of any convenient shape, such as an elongate cylinder having a diameter selected to be easily gripped by a user's hand.

The screwdriver 11 also includes a blade 19 which, in this case, is a generally cylindrical member which extends along the longitudinal axis 21 of the device from the handle 17 and having an outer extremity 23. The outer extremity 23 is a wedge-shaped member which tapers from a thick back region 25 to a thin outermost extent 27. The thin outermost extent 27 comprises a flange which is formed by oppositely arranged grooves 29, 31. Each groove 29, 31 runs perpendicular to the longitudinal axis 21 and gradually increases in diameter, but in opposite directions. As will be explained, the flange regions 33, 35 formed by the oppositely arranged grooves 29, 31 are adapted to seat beneath downwardly facing shoulders provided in the complimentary surface 37 provided in the head 13 of the mating screw 15.

The screwdriver 11 also includes a coupling means, such as sliding sleeve 39 which is slidably mounted on the blade 19 for exerting an axially directed force on the mating screw 15 once the engagement means are engaged to thereby lock the screwdriver 11 and the mating screw 15. In the embodiment shown in FIG. 2, the sliding sleeve 39 is a generally cylindrical member which circumscribes the blade 19 and which is slidable between a retracted position (FIG. 2) and a set position (FIG. 3) in which the sleeve 39 contacts the screw head 13 to exert an axially directed force on the screw. In the embodiment of FIG. 2, the sliding sleeve 39 includes a pair of oppositely arranged longitudinal extensions 41, 43 which extend generally parallel to the longitudinal axis 21 and which have outer extents 45 which are received within the complementary surface of the mating screw 15. Each longitudinal extension 41, 43 rides within a channel 47 formed in the outer extremity 23 of the blade 19.

Each blade 19 can also be provided with a thumbengaging nub 40 and with spring loaded detents, such as balls 49, 50. Ball 49 is received within a mating opening 51 when the sleeve is in the set position for maintaining the sleeve 39 in the set position to positively couple the screwdriver and the mating screw, even when no force is being exerted by the user. Ball 50 is received within the complimentary opening 51 when the sleeve is in the retracted position.

As shown in FIG. 1, the complementary surface 37 provided in the screw head 13 can be a transverse slot which extends through the screw head 13 generally perpendicular to the longitudinal axis 42 of the screw. The transverse slot 37 has opposing sidewalls 53, 55 at least one of which includes a downwardly facing shoulder 57. In this case, the opposing sidewall 55 also includes a downwardly facing shoulder 59. Each of the oppositely arranged flange regions 33, 35 of the screwdriver 11 are adapted to engage the downwardly facing shoulders 57, 59, respectively to releasably engage the screwdriver 11 and screw 15. The engagement can be effected by inserting the screwdriver thin outermost extent 27 vertically downward within the opening formed between the shoulders 57, 59, as viewed in FIGS. 1 and 2. It is not necessary to slide the screwdriver outermost extent 27 into the transverse slot 37 in a radial direction, i.e., perpendicular to the longitudinal axis 21, as viewed in FIG. 1.

In operation, the screwdriver thin outermost extent 27 is inserted into the complimentary surface 37 of the mating screw 15 and centered approximately within the transverse slot. A selected one of the screw and screwdriver is then rotated to engage the flange region 33, 35 beneath the downwardly facing shoulders 57, 59. Once the screw and screwdriver are engaged, the sliding sleeve 39 is moved vertically downward, as viewed in FIG. 2 and 3, whereby the longitudinal extensions 41, 43 enter the transverse slot 37 to substantially fill the remaining void areas of the slot (61, 63 in FIG. 4). Any force which is exerted by the longitudinal extensions 41, 43 on the bottom wall of the transverse slot 37 causes an oppositely directed force to be exerted by the flange regions 33, 35 on the downwardly facing shoulders 57, 59. In this way, the blade outermost extent 27 is wedged within the slot 37 in a particular angular orientation so that the blade 19 and screw 15 are interlocked. With the sliding sleeve 39 moved to the set position shown in FIG. 3, the ball detent 49 is received within the opening 51 so that the blade and screw remain interlocked, even when no pressure is exerted by the user.

Figure 6:
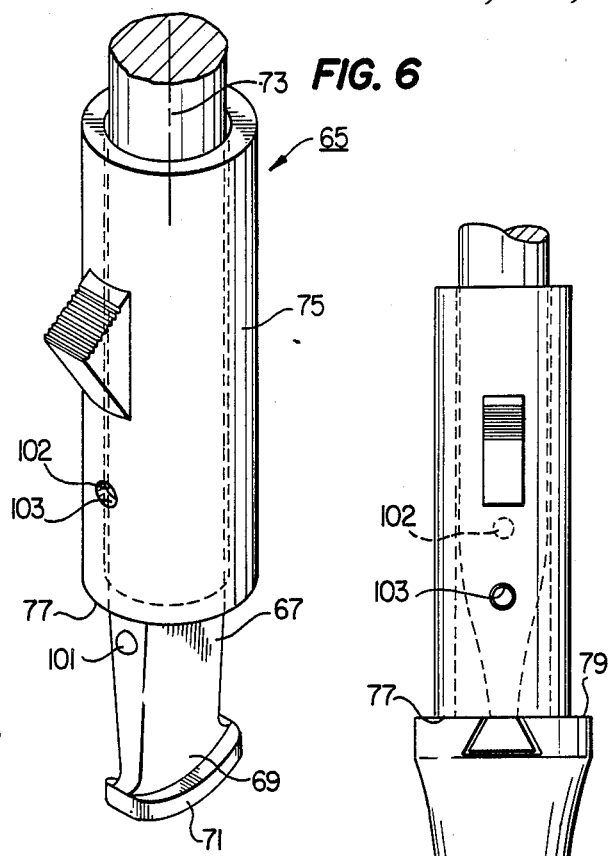
FIG. 6 is a perspective view of another embodiment of the screwdriver of the invention with the handle partly broken away.

FIG. 6 shows another embodiment of the screwdriver of the invention designated as 65. The screwdriver 65 includes a blade 67 having an outer extremity 69 provided with engagement means for releasably engaging a complimentary surface provided in the head of a mating screw. The engagement means preferably comprises an arcuate flange 71 which extends transversely to the longitudinal axis 73 of the screwdriver. The blade 67 is circumscribed by a sliding sleeve 75 having a cylindrical end face 77 adapted to contact the planar end surface 79 of the mating screw 81.

Figure 7:
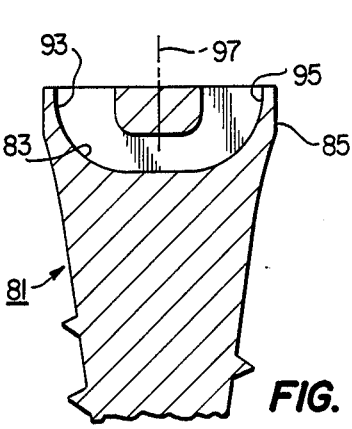
FIG. 7 is a cross-sectional view taken along lines VII.—VII.
Figure 8:
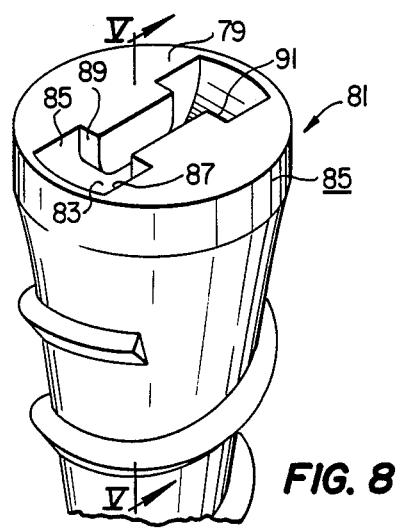
in FIG. 8.
Figure 9:
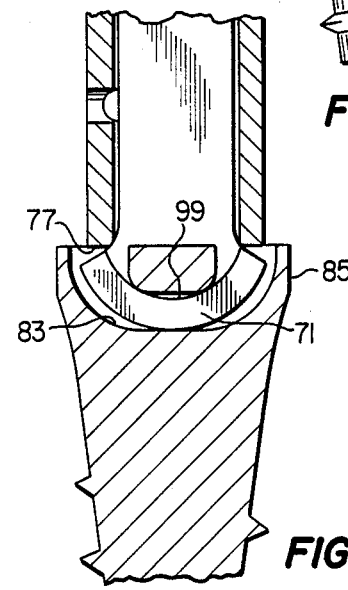
FIG. 9 is a side, cross-sectional view of the mating screw and screwdriver of FIGS. 6 and 8 in the engaged and coupled position.

As shown in FIGS. 7-9, the complementary surface provided in the head of the mating screw 81 is a curved recess 83 which forms a semi-circular slot extending through the screw head 85. The semi-circular slot 83 has opposing sidewalls 85, 87 at least one of which includes a downwardly facing shoulder 89. Preferably, the other sidewall 87 is also provided with a downwardly facing shoulder 91 which is spaced-apart from the downwardly facing shoulder 89 by a distance which is at least as great as the thickness of the blade outer extremity 69. As best seen in FIG. 8, the planar end surface 79 of the screw 81 is perpendicular to the longitudinal axis of the screw and the semi-circular slot has outer extents 93, 95 which extend through the planar end surface of the screw 79.

Figure 10:
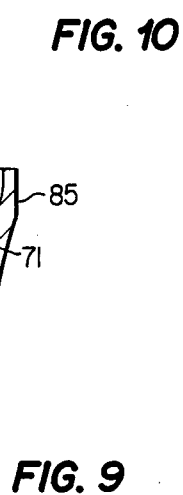
FIG. 10 is a side view of the mating screw and screwdriver of FIGS. 6 and 8 in the engaged and coupled position with portions of the screwdriver blade shown in dotted lines.

In operation, the screwdriver flange 71 slides within the curved recess 83 in an arcuate path which is generally transverse to the longitudinal axis 97. After locating the midpoint (99 in FIG. 9) of the flange 71 in the approximate mid-region of the curved recess 83, the sliding sleeve 75 is moved vertically downward so that the cylindrical end face 77 contacts the planar end surface 79 of the mating screw. A spring loaded ball 101 on the blade 67 is received within a complementary opening 103 to act as a detent for holding the sleeve in the set position shown in FIGS. 9 and 10. Thus the screwdriver 65 and screw 81 are positively coupled and interlocked even when no axially directed force is exerted by the user. Ball 102 is received within the opening 103 when the sleeve is in the retracted position shown in FIG. 6.

An invention has been provided with several advantages. The interlocking screwdriver and mating screw of the invention can be quickly and easily engaged to prevent bounce, slip-off or misalignment of the screwdriver and mating screw during use. The coupling sleeve positively interlocks the screwdriver and screw after the engagement thereof to maintain the axial alignment of the screw and allow a greater driving force to be applied when screwing or unscrewing the mating screw from the workpiece.

While the invention has been shown in only two of its forms, it is not thus limited but is susceptible to various changes and modifications without departing from the spirit thereof.

I claim:

1. A mating screw and screwdriver combination with interlocking features for releasably coupling the screwdriver to a head of the mating screw to facilitate driving the mating screw into a workpiece, the mating screw and screwdriver comprising:

a handle;

a blade on the handle, the blade having an outer extremity opposite the handle;

engagement means on the outer extremity of the blade for releasably engaging a complimentary surface provided in the head of the mating screw, the engagement means including a flange on the outer extremity of the blade which seats beneath a downwardly facing shoulder provided in the complimentary surface of the head of the mating screw, the mating screw being provided with a planar end surface having a peripheral border; and a coupling means associated with the handle for exerting an axially directed force on the screw once the engagement means are engaged to thereby positively couple the screwdriver and mating screw, wherein the coupling means includes a sliding sleeve which circumscribes the blade, the sliding sleeve being slidable between a set position in which the sleeve exerts an axially directed force on the screw and a retracted position, the sliding sleeve having a cylindrical end face which contacts the planar end surface of the mating screw within the peripheral border thereof to exert said axially directed force.

2. A screwdriver with interlocking features for releasably coupling the screwdiver to a head of a mating screw to facilitate driving the mating screw into a workpiece, the screwdriver comprising:

a handle;

a blade on the handle, the blade having an outer extremity opposite the handle;

engagement means on the other extremity of the blade for releasably engaging a complimentary surface provided in the head of the mating screw;

coupling means associated with the handle for exerting an axially directed force on the screw once the engagement means are engaged to thereby positively couple the screwdriver and mating screw, wherein the coupling means includes a sliding sleeve which circumscribes the blade, the sliding sleeve being slidable between a set position in which the sleeve exerts an axially directed force on the screw and a retracted position; and wherein the sliding sleeve has a longitudinal extension which is received within the complimentary surface of the mating screw.

3. A screwdriver with interlocking features for releasably coupling the screwdriver to a head of a mating screw to facilitate driving the mating screw into a workpiece, the screwdriver comprising:

a handle;

a blade on the handle, the blade having an outer extremity opposite the handle;

engagement means on the outer extremity of the blade for releasably engaging a complimentary surface provided in the head of the mating screw;

coupling means associated with the handle and movable between a retracted position and a set position for exerting an axially directed force on the screw once the engagement means are engaged to thereby positively couple the screwdriver and mating screw; and detent means for maintaining the coupling means in the set position in the absence of any external force exerted by the user.

4. The screwdriver of claim 3, wherein the coupling means is a sliding sleeve which circumscribes the blade and wherein the detent means is a spring-loaded ball which is received within a complimentary opening provided in the sliding sleeve when the sleeve is in the set position.

5. A screwdriver with interlocking features for releasably coupling the screwdriver to a head of a mating screw to facilitate driving the mating screw into a workpiece, the screwdriver comprising:

a handle;

a blade on the handle, the blade having an outer extremity opposite the handle;

a flange located on the outer extremity of the blade and extending outwardly therefrom generally perpendicular to the longitudinal axis of the blade for releasably engaging a complimentary surface provided in the head of the mating screw, the complimentary surface comprising a transverse slot which extends through the screw head generally perpendicular to the longitudinal axis of the screw, the transverse slot having opposing sidewalls at least one of which includes a downwardly facing shoulder; and a generally cylindrical sliding sleeve circumscribing the blade, the sliding sleeve having at least one downwardly extending projection which is slidable between a retracted position and a set position in which the downwardly extending projection exerts an axially directed force on the screw to thereby interlock the screwdriver and mating screw, the downwardly extending projection being received within the transverse slot in the mating screw head below the level of the downwardly facing shoulder when in the set position.

* * * * *